(12) United States Patent
Gladwell et al.

(10) Patent No.: US 8,479,435 B1
(45) Date of Patent: Jul. 9, 2013

(54) SYSTEM AND METHOD FOR DISRUPTING SUSPECT OBJECTS

(75) Inventors: T. Scott Gladwell, Albuquerque, NM (US); Justin R. Garretson, Albuquerque, NM (US); Clinton G. Hobart, Albuquerque, NM (US); Mark J. Monda, St. Louis, MO (US)

(73) Assignee: Sandia Corporation, Albuquerque, NM (US)

( * ) Notice: Subject to any disclaimer, the term of this patent is extended or adjusted under 35 U.S.C. 154(b) by 315 days.

(21) Appl. No.: 12/912,151

(22) Filed: Oct. 26, 2010

(51) Int. Cl.
*F41G 1/00* (2006.01)

(52) U.S. Cl.
USPC .............. 42/135; 89/1.13; 102/402; 102/403

(58) Field of Classification Search
USPC ........... 42/135; 89/1.13; 102/402, 403; 86/50
See application file for complete search history.

(56) References Cited

U.S. PATENT DOCUMENTS

| | | | |
|---|---|---|---|
| 4,046,055 A | 9/1977 | McDanolds et al. | |
| 4,062,112 A | 12/1977 | Lake | |
| 4,169,403 A | 10/1979 | Hanson | |
| 4,779,511 A | 10/1988 | Proctor et al. | |
| 4,957,027 A | 9/1990 | Cherry | |
| 5,210,368 A | 5/1993 | Heller, Jr. et al. | |
| 5,515,767 A * | 5/1996 | Gilbert | 89/1.701 |
| 5,785,038 A * | 7/1998 | Mattern | 124/56 |
| 6,281,507 B1 | 8/2001 | Ghelmansarai | |
| 6,298,763 B1 | 10/2001 | Greenfield et al. | |
| 6,359,961 B1 | 3/2002 | Aufrichtig et al. | |
| 6,644,166 B2 | 11/2003 | Alexander et al. | |
| 7,228,778 B2 | 6/2007 | Edwards et al. | |
| 7,323,692 B2 * | 1/2008 | Rowlands et al. | 250/370.09 |
| 2005/0025280 A1 | 2/2005 | Schulte | |
| 2007/0036265 A1 * | 2/2007 | Jing et al. | 378/37 |
| 2008/0110327 A1 * | 5/2008 | Quinn | 89/41.02 |
| 2008/0112541 A1 | 5/2008 | Hardesty | |
| 2008/0254738 A1 | 10/2008 | Brumley et al. | |
| 2009/0189091 A1 | 7/2009 | Holly et al. | |

* cited by examiner

*Primary Examiner* — Michael Carone
*Assistant Examiner* — Benjamin Gomberg
(74) *Attorney, Agent, or Firm* — Michael A. Beckett

(57) ABSTRACT

A system and method for disrupting at least one component of a suspect object is provided. The system includes a source for passing radiation through the suspect object, a screen for receiving the radiation passing through the suspect object and generating at least one image therefrom, a weapon having a discharge deployable therefrom, and a targeting unit. The targeting unit displays the image(s) of the suspect object and aims the weapon at a disruption point on the displayed image such that the weapon may be positioned to deploy the discharge at the disruption point whereby the suspect object is disabled.

3 Claims, 9 Drawing Sheets

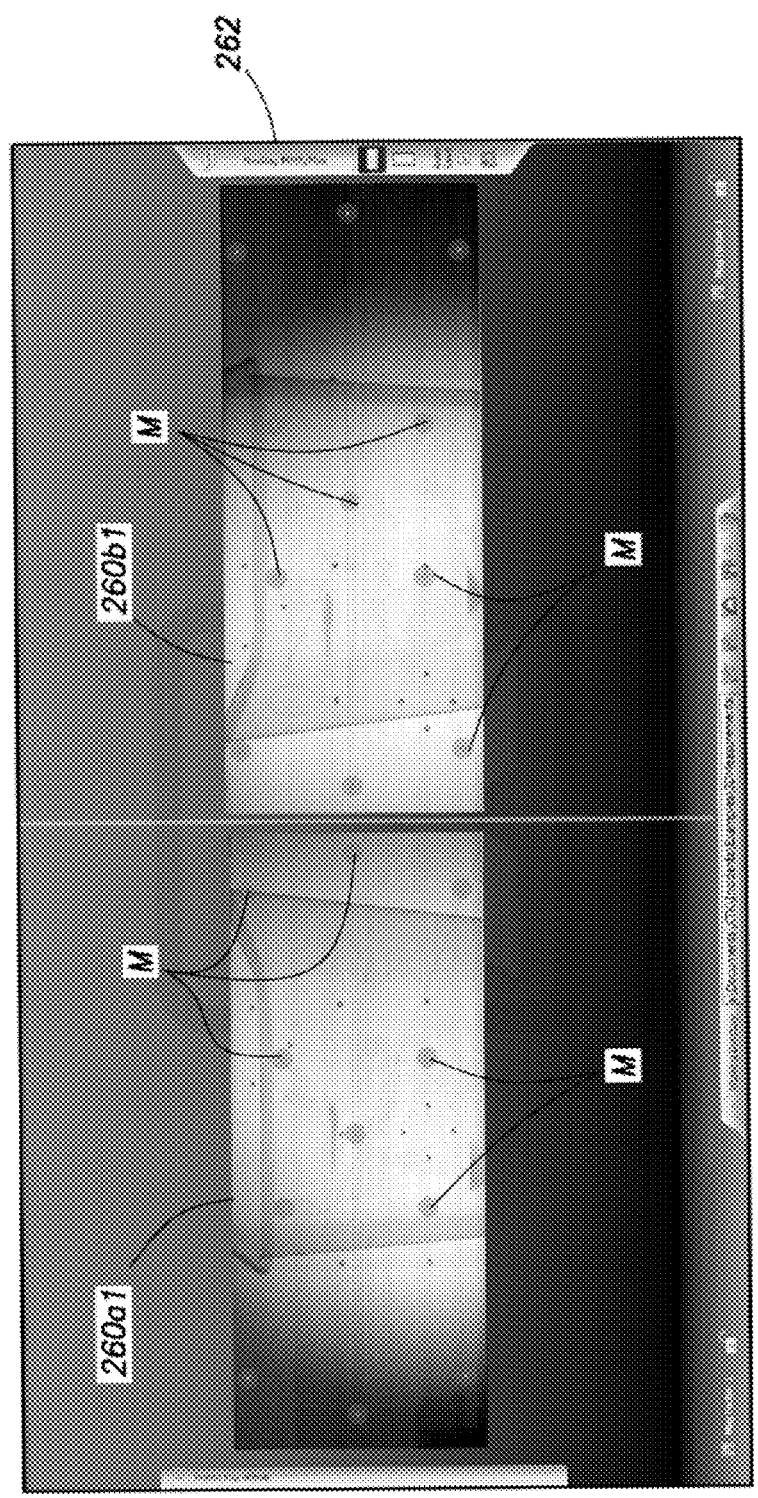
FIG. 2B1

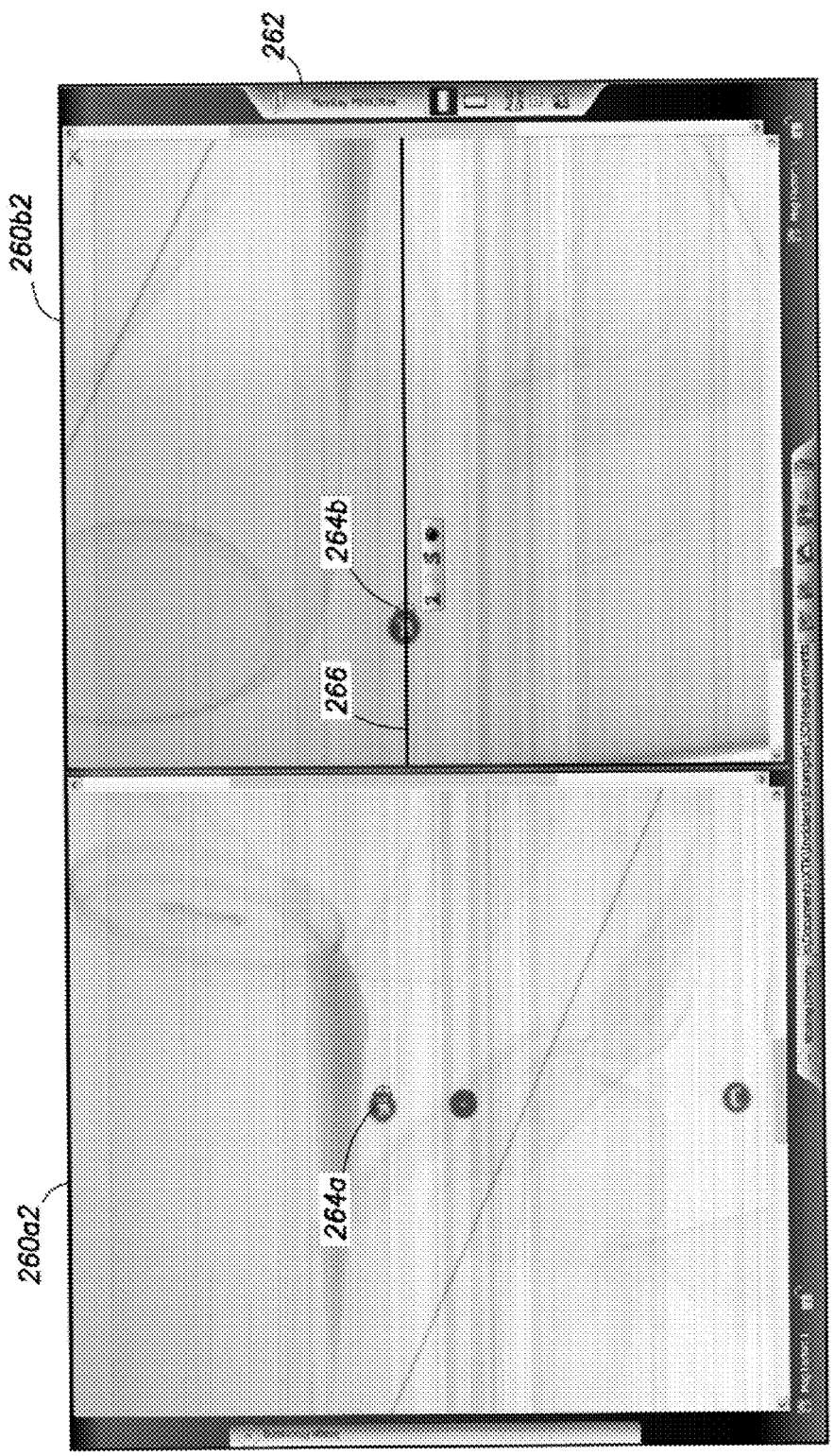
FIG. 2B2

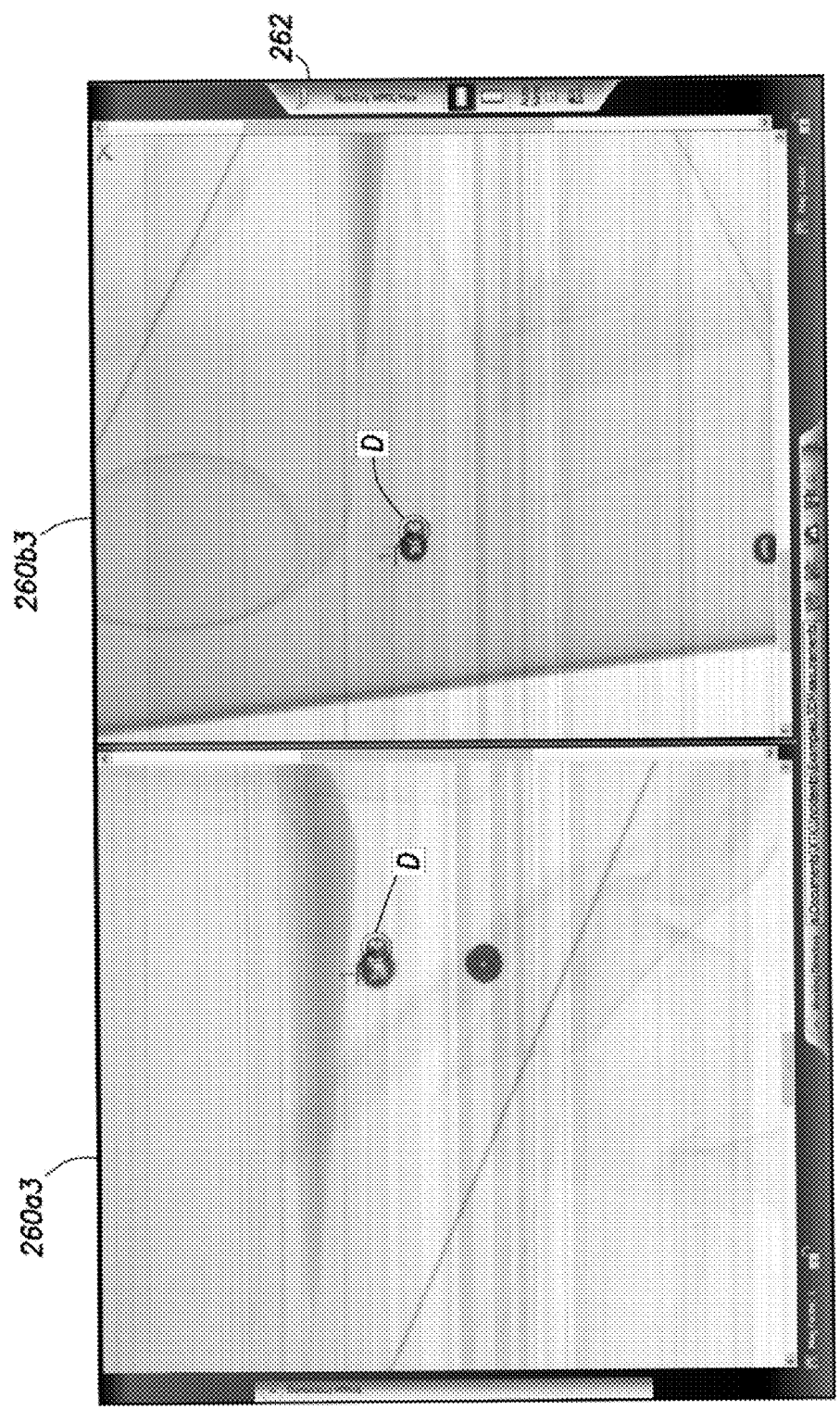
FIG.2B3

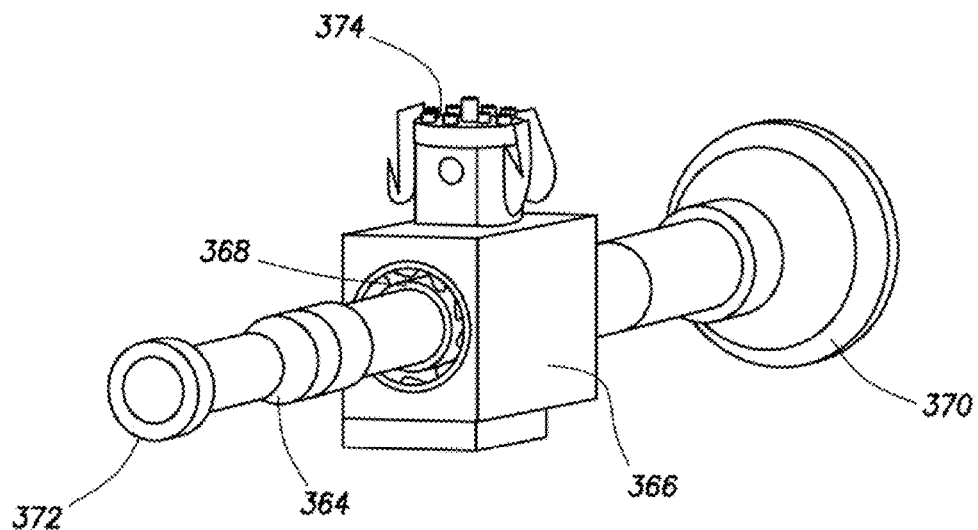
FIG.3B1
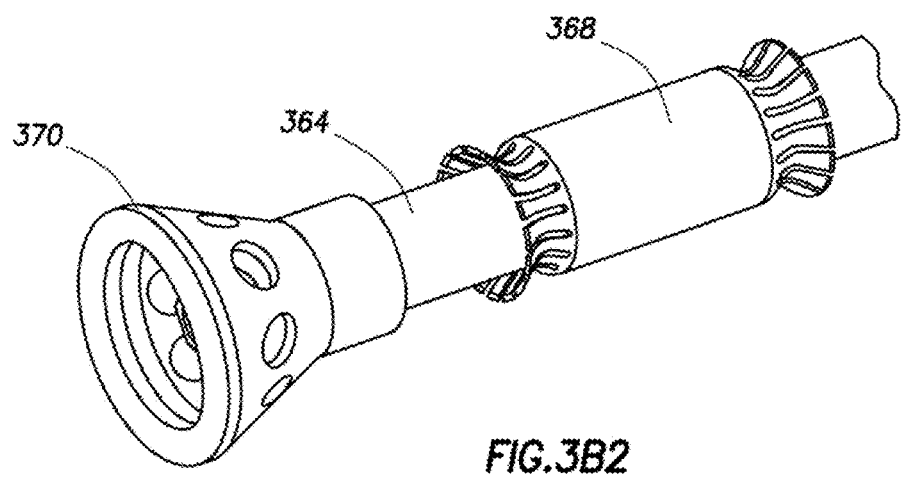
FIG.3B2

SYSTEM AND METHOD FOR DISRUPTING SUSPECT OBJECTS

STATEMENT OF GOVERNMENT INTEREST

This invention was developed under Contract DE-AC04-94AL85000 between Sandia Corporation and the U.S. Department of Energy. The U.S. Government has certain rights in the invention.

BACKGROUND OF THE INVENTION

1. Field of the Invention

The present invention relates to techniques for disrupting a suspect object. More particularly, the present invention relates to techniques for investigating, targeting, disabling and/or otherwise disrupting a suspect object, such as an explosive device.

2. Background of the Related Art

Suspect objects are items that potentially pose a significant threat to persons and/or property. A suspect object may be, for example, a luggage, box or other container that is suspected of containing dangerous materials (e.g., explosives, volatile materials, toxins, etc.) that may cause injury and/or damage. Techniques have been developed to detect suspect objects as described, for example, in US Patent Application No. 2005/0025280. It may be preferable to investigate the contents of the suspect object without touching the object. Techniques have been developed to image contents of an object as described, for example in U.S. Pat. Nos./Application Nos. 6,359,961, 6,281,507, and 2008/0112541.

In cases where the suspect object is determined to pose a threat, it is often necessary to de-activate, neutralize or otherwise disable the suspect object or one or more of its components to render the suspect object inoperable. Attempts have been made to disable explosive devices by deploying projectiles or substances into explosive devices (as described, for example, in U.S. Pat. Nos. 4,046,055, 4,169,403, 4,779,511, 4,957,027, 5,210,368, 5,515,767, 6,298,763, 6,644,166, and 7,228,778), or by disabling electrical components within the explosive device (as described in U.S. Pat. No./Application Nos. 4,062,112, 2009/0189091, or 2008/0254738).

Despite the development of techniques for identifying or disabling suspect objects, there remains a need for advanced techniques for effectively disrupting suspect objects. It may be desirable to investigate the suspect object, preferably without contacting the suspect object. Such investigation preferably provides a highly accurate view of the contents of the suspect object. It may be further desirable to disable the suspect object, preferably from a distance. Such disablement is preferably accurately aimed at key components of the suspect object. Preferably, such capabilities involve one or more of the following, among others: compact operability, portability, easy assembly and use, transportability, accuracy, operation in difficult conditions, simple operation, disruption of select components (preferably without affecting other components), preventing suspect object and/or component operation, visually inspecting the explosive device and/or its contents, manual and/or automatic operation, operability about obstacles, etc.

BRIEF DESCRIPTION OF THE DRAWINGS

So that the features and advantages of the present invention can be understood in detail, a more particular description of the invention may be had by reference to the embodiments thereof that are illustrated in the appended drawings. These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness.

FIGS. 2B1-2B3 are pictorial views of images generated by the investigation unit of FIG. 2A.

FIGS. 3B1 and 3B2 are detailed views of a weapon of the weapon unit of FIG. 3A.

DETAILED DESCRIPTION OF THE INVENTION

Presently preferred embodiments of the invention are shown in the above-identified figures and described in detail below.

Figure 1A:
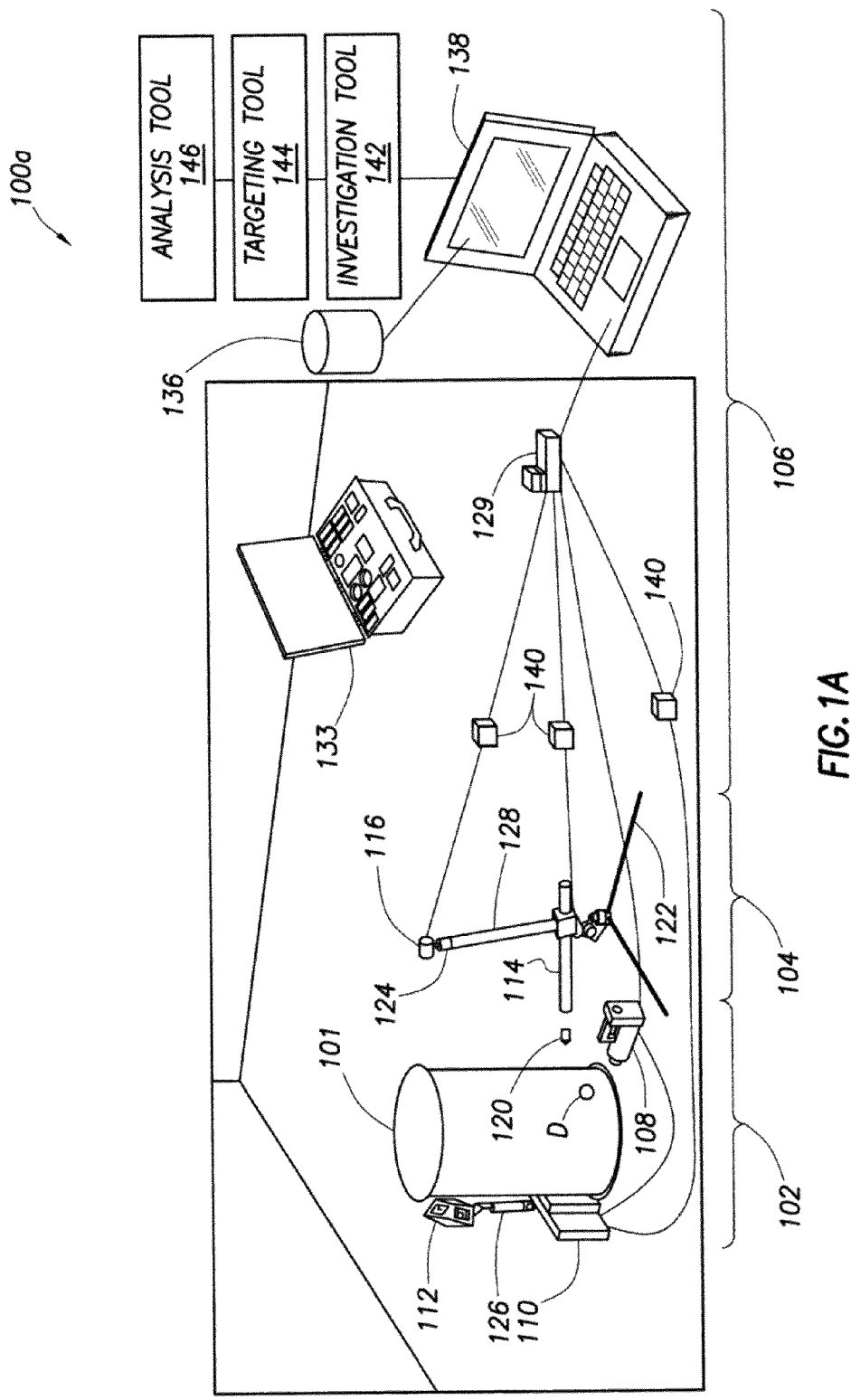
FIGS. 1A and 1B are schematic diagrams depicting Line Of Sight (LOS) and No Line Of Sight (NLOS) configurations, respectively, of a system for disrupting a suspect object, in accordance with the invention.
Figure 1B:
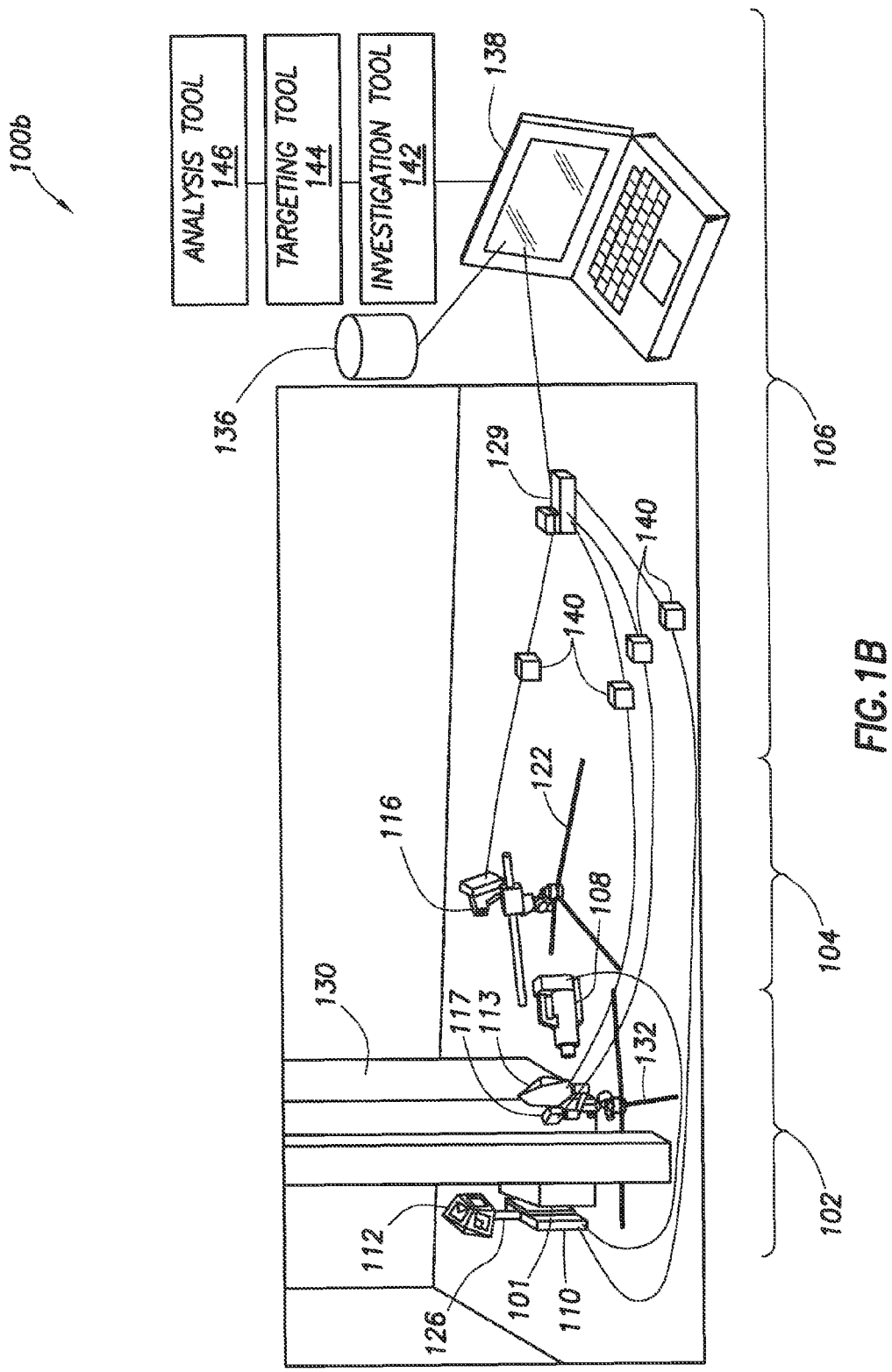

FIGS. 1A and 1B are schematic diagrams depicting alternate configurations of a disruption system 100a,b, respectively, for disrupting a suspect object 101. The disruption systems 100a,b each have an investigation unit 102 to investigate the suspect object, a weapon unit 104 to disable the suspect object, and a targeting unit 106 for aiming the weapon unit 104 at the suspect object 101.

The investigation unit 102 includes a source 108 and a screen 110 for creating an image of the suspect object 101. The source 108 may be a conventional radiation source capable of emitting sufficient radiation through the suspect object 101 to generate an image on screen 110, as will be described further herein. The investigation unit 102 is also provided with a fixture (or marker) 112 positionable about the screen 110. The fixture 112 serves as a physical marker for locating the investigation unit 102 in 3D space, as will be described further herein.

The weapon unit 104 has a weapon 114, camera 116, and a discharge 120 for disabling at least one component of the suspect object 101. The weapon 114 is supported on a firing stand (or tripod) 122, and is positionable for firing at the suspect object 101. The camera 116 is mounted on the weapon 114 via a camera mount 124. The camera 116 is preferably positioned to view the fixture 112 of the investigation unit 102 for alignment therewith. Preferably, the fixture 112 is centered in the camera's field of view when the weapon 114 is pointed toward the suspect object 101. The alignment of the camera 116 may be used to aim the weapon 114 such that the discharge 120 may be deployed to a disruption point D, as will be described further herein.

The disruption system 100a of FIG. 1A is depicted as a Line Of Sight (LOS) disruption system 100a positioned about the suspect object 101. In the LOS (or unobstructed) configuration of FIG. 1A, the suspect object 101 is within a line of sight of the source 108 and the screen 110. As shown in this configuration, the fixture 112 has been mounted on a fixture extender 126, and the camera 116 has been mounted on a camera extension 128 to provide line of sight therebetween.

The disruption system 100b of FIG. 1B is a No Line Of Sight (NLOS) disruption system 100b positioned about the suspect object 101 with an obstacle 130 therebetween. In the NLOS (or obstructed) configuration of FIG. 1B, the obstacle 130 prevents a direct line of sight between the camera 116 and the screen 110. To overcome the obstacle 130, the disruption system 100b is further provided with a relay unit 132 in the line of sight of both the investigation unit 102 and the weapon unit 104. The relay unit 132 includes a camera 117 and a fixture 113. The relay unit 132 may be used as a link to provide line of sight indirectly between the investigation unit 102 and the weapon unit 104, as will be described further herein.

One or more stands, extenders, mounts, relay units or other devices may be provided to position various components of the disruption system 100a,b about the suspect object 101. Preferably, the devices are adjustable to permit selective positioning of the components. One or more disruption systems 100a,b of may be provided about one or more suspect objects 101. Preferably, the components of the disruption system 100a,b are portable, adjustable and movable to provide various configurations as needed to conform to a given situation, and to effectively disrupt the suspect object 101. As seen in FIG. 1A, a carrying case 133 may optionally be provided for transporting one or more components.

Referring still to FIGS. 1A and 1B, the targeting unit 106 is schematically depicted as being linked to the investigation unit 102 and the weapon unit 104 via a communication hub 129 for communication therewith. The targeting unit 106 includes a database 136, a processor 138 and controllers 140. The targeting unit 106 may provide image acquisition, image enhancement, video tracking, real-time camera pose estimation, system component locators, image measurement, stereo triangulation, display updates, aiming instructions and other capabilities.

Data received from the investigation unit 102, weapon unit 104 and/or other sources (e.g., historical data, user inputs, etc.) may be stored in database 136. The processor 138 may use the data to generate images, perform calculations, generate reports, provide commands, etc.

The processor 138 includes an investigation tool 142, a targeting tool 144 and an analysis tool 146. The investigation tool 142 may provide images of the suspect object 101 and its contents, and the targeting tool 144 may aim the weapon unit 104 at the disruption point D of the suspect object 101. The analysis tool 146 may be used alone or with the investigation tool 142 and/or the targeting tool 144 to assist in performing various operations, such as performing calculations, generating reports, generating commands and/or providing feedback, as will be described more fully herein. Commands generated by the processor 138 may be used to activate controller(s) 140 to operate the disruption system, as will be described further herein.

Figure 2A:
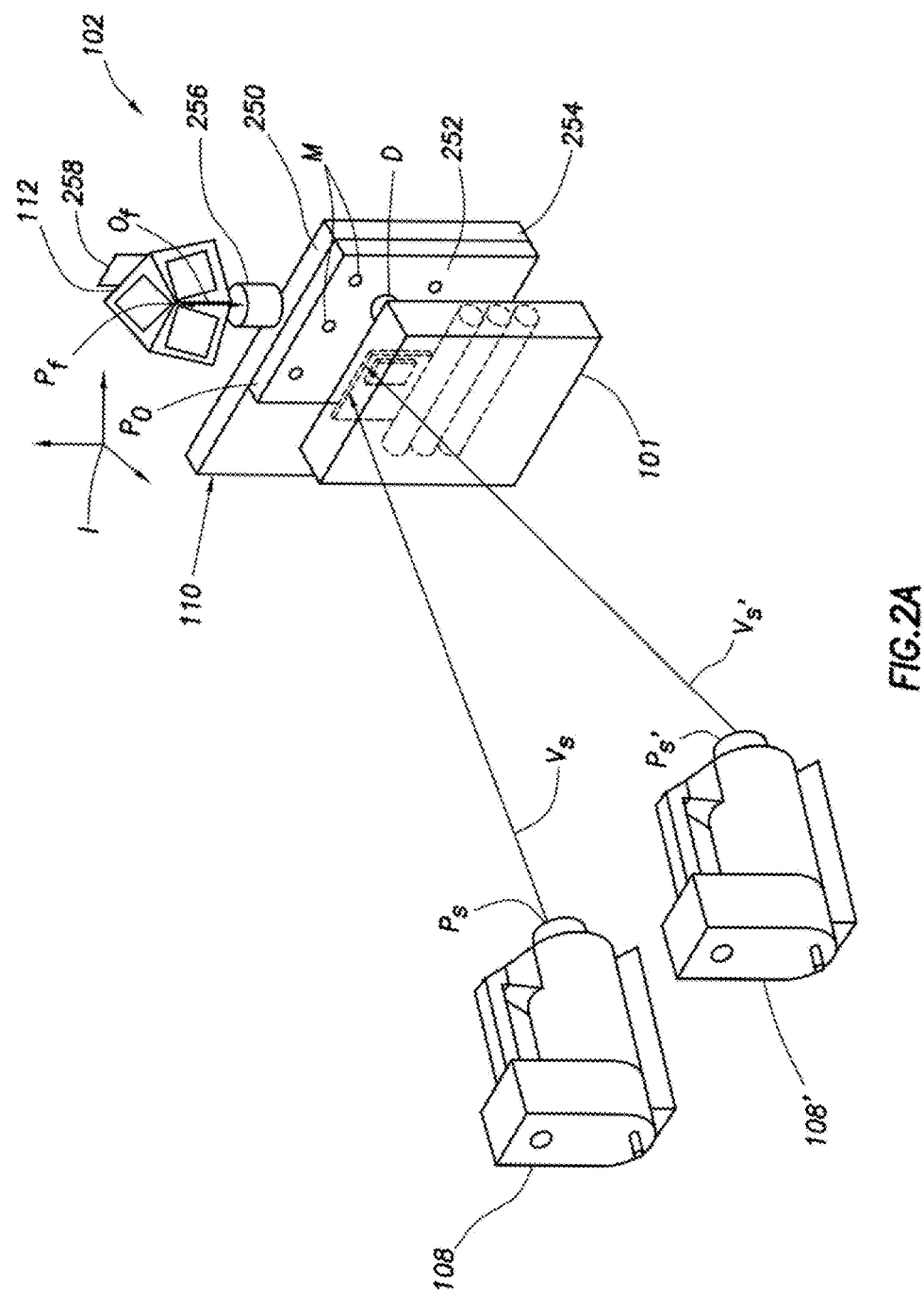
FIG. 2A is a schematic diagram depicting an investigation unit of the disruption system of FIG. 1.

FIG. 2A is a schematic diagram depicting the investigation unit 102 of the disruption system 100a of FIG. 1A in greater detail. The source 108 is positioned for passing radiation through the suspect object 101, and creating x-ray (or stereo radiograph) images onto the screen 110. Preferably, multiple sources 108, 108' (or a single source at multiple locations) are provided at different positions relative to the suspect object 101 and to the screen 110. The source(s) 108 may be placed on the floor as shown, or provided with a support to raise the source(s) 108 to a desired height.

The screen 110 includes a film 250, an x-ray transparent face plate 252, screen markets M, and a screen stand 254. Radiation from the source 108 passes through the protective x-ray transparent face plate 252 and onto the film 250 to create an image thereon. Screen markers M, such as tungsten dots, are embedded in the face plate 252 such that they are visible in the image. One or more screen markers M may be positioned about the screen 110 to assist in measuring, locating and/or otherwise identifying features of the image. Screen markers M may be placed at known positions on face plate 252 to enable a determination of the location of the source 108.

The face plate 252 and film 250 may be supported on screen stand 254. The screen stand 254 may have a fixture mount 256 for adjustably supporting the fixture 112 thereon. The fixture 112 is preferably adjustably positionable on the screen 110 via fixture mount 256. The fixture 112 may be a three dimensional device used to assist with the targeting of the weapon 114. As shown, the fixture 112 has three faces to enable tracking at shallower angles between the camera 116 and fixture 112 than may not be possible with a planar configuration. The fixture 112 is preferably provided with multiple panels with markings thereon to facilitate visual positioning, and a geometric design having corners on the panels at different depths to enhance tracking accuracy.

A light 258, such as a chem-light, may be provided to illuminate the fixture 112 in no or low light conditions. The light 258 may be inserted into fixture 112 to illuminate the visual pattern of the fixture. One or more lights may be positioned about, for example, one or more fixtures 112 of the disruption system 100a,b as desired.

The investigation unit 102 preferably has known geometries about an image coordinate system I centered at position $P_0$ at a fixed point on screen 110. The position $P_s$ of the first source 108, $P_{s'}$ of the second source 108,' and $P_f$ of the fixture 112 are known. The position $P_f$ is at a known offset $O_f$ from the screen 110. A first vector $V_s$ is defined from the first source 108, through the object 101 and to a pixel location on the screen 110. A second vector $V_{s'}$ is defined from the second source 108', through the object 101 and to a pixel location on the screen 110. The geometry of the configuration may be used to determine positions of the components of the suspect object 101 using conventional stereo triangulation calculations.

As shown in FIGS. 2B1-2B3, images 260a1-3, b1-3 generated from the investigation unit 102 may be displayed on display 262 of processor 138 (FIG. 1). The investigation tool 142 (FIGS. 1A and 1B) may be used to gather the images and display them as shown. Preferably, images from each source 108, 108' are shown as dual images on a user display 262. The images may be, for example, three dimensional stereo radiographs captured from a specially calibrated portable x-ray imaging unit.

The markers M on face plate 252 are detected by the investigation unit 102 and identified on the images 260a1, b1 as shown in FIG. 2B1. The location of the markers M, as well as the other geometry of the investigation unit 102 as described with respect to FIG. 2A, are used to determine the location of the sources 108, 108'. As shown in FIG. 2B2, a user may select an ID point 264a on image 260a2 to identify a component for targeting. The investigation unit 102 uses the geometry of the investigation unit 102 and the pixel locations to extend an epipolar line 266 into image 260b2 of FIG. 2B2. The epipolar line 266 may be used to assist the user in identifying an ID point 264b on image 260b2 corresponding to the component targeted in image 260a2. The investigation unit 102 will define a disruption point D in the images based on the selected ID points 264a,b as shown in FIG. 2B3.

Referring back to FIGS. 1A and 1B, the targeting unit 106 may be used to receive information, perform necessary calculations, analyze information and/or otherwise process the information to achieve the desired operation. The targeting unit 106 is linked to the investigation tool 142 for generating images of the suspect object 101. The investigation tool 142 preferably uses state-of-the-art computer vision and position-registration technologies to generate and/or refine images from the data received from the investigation unit 102 (and/or other sources). Preferably, the investigation tool 142 provides 3D images of the suspect object 101 and 3D points therein as shown in FIGS. 2B1-2B3.

The investigation tool 142 may be used to compute the 3D locations of the source 108 and other components relative to the origin $P_0$. These 3D locations may then be related to the position of the fixture 112. The analysis tool 146 may be used to perform stereo triangulation or other calculations alone or in combination with the investigation tool 142. The investigation tool 142 may be used in conjunction with the analysis tool 146 to define one or more disruption points D of the suspect object 101.

Figure 3A:
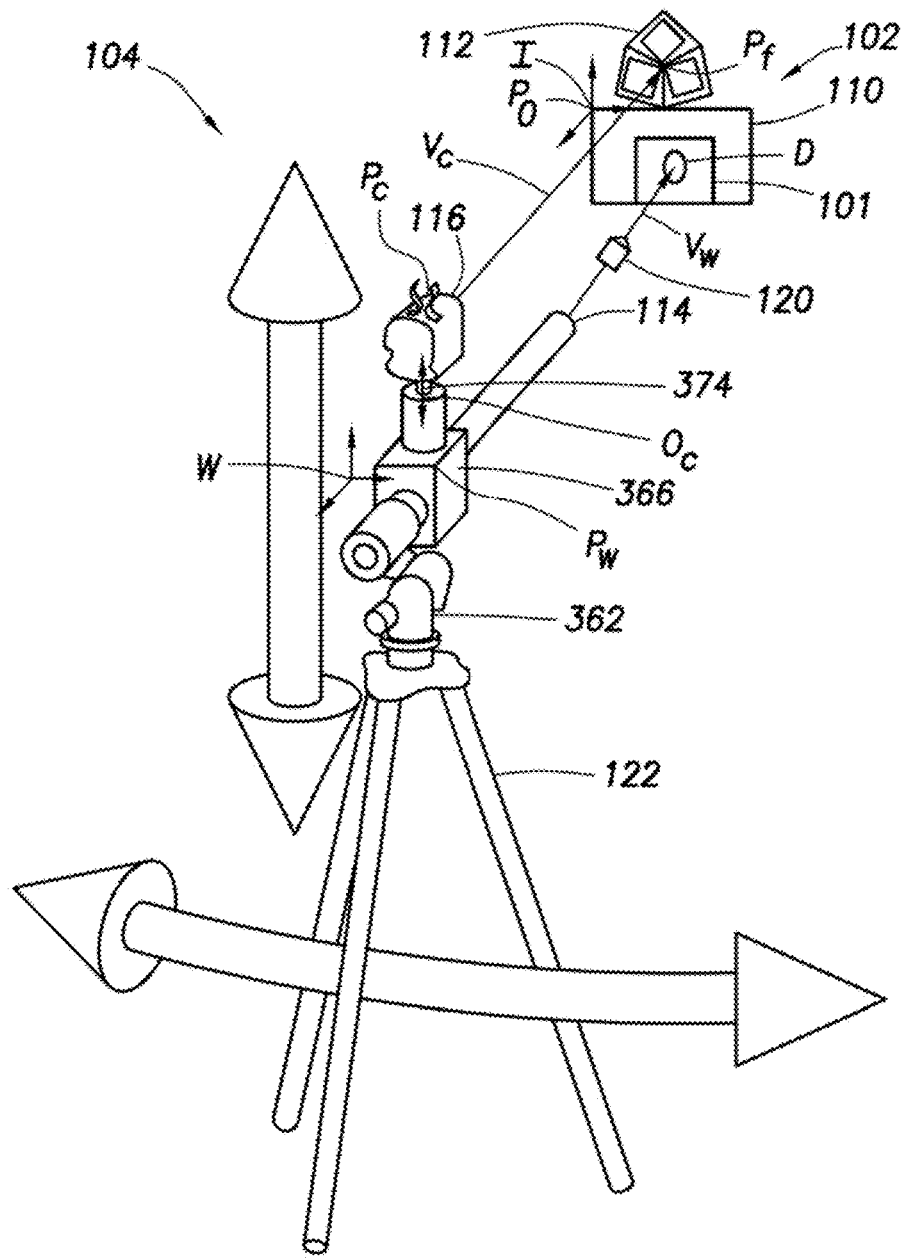
FIG. 3A is a schematic diagram depicting a weapon unit of the disruption system of FIG. 1B.

FIG. 3A is a schematic diagram depicting the weapon unit 104 of the disruption system 100a of FIG. 1A. The weapon unit 104 includes the weapon 114 adjustably mounted on firing stand 122. The firing stand 122 as shown is a tripod with a weapon mount (or aiming stage) 362 that may be adjusted to provide vertical and radial adjustment of the weapon 114 positioned thereon.

FIGS. 3B1 and 3B2 show detailed views of portions of the weapon 114. The weapon 114 may be a conventional weapon, such as a PAN (FIG. 3A), T3 (FIGS. 3B1, 3B2), or other weapon, capable of deploying a discharge into the suspect object 101. The weapon 114 includes a firing shaft 364, a weapon block 366, and a disruptor sleeve 368. The weapon block 366 is positionable on the weapon mount 362. The weapon block 366 is positionable on the firing shaft 364 with the disruptor sleeve 368 therebetween. The sleeve 368 is configured to absorb recoil of the weapon 114 upon release of the discharge 120 to prevent potential damage to the components of the weapon unit 104. A breech cap 370 is positioned at a non-discharging end of the firing shaft 364. A muzzle protector 372 may be positioned on a discharge end of the firing shaft 364 as shown in FIG. 3B1.

The firing shaft 364 may be hollow for deploying the discharge 120 therefrom. The discharge 120 may be a conventional projectile deployable by the weapon 114 into the suspect object 101. In such cases, the weapon 114 may be a gun, pressurized tube or other mechanism capable of deploying the discharge 120 into the suspect object. Alternatively, the discharge 120 may be, for example, an electrical signal emitted by the weapon into the suspect object 101 for disabling the electrical activation thereof.

As shown in FIG. 3A, camera 116 is adjustably secured on the weapon block 366 by camera mount 374. The weapon mount 362 and the camera mount 374 may have attachment points (not shown) for securing the camera 116 and the weapon 114 in place. Various features, such as alignment features, magnets or other devices, may be provided to secure the components of the weapon unit 104 in place to enhance precision and/or repeatability.

The camera 116 may be a conventional camera capable of capturing images of the fixture 112. The camera 116 is preferably positionable within line of sight of fixture 112. The camera 116 may be used to track well-defined features of the fixture 112 (e.g., squares on fixture have known patterns and spacing), and compute camera 116 position relative to those features. The camera 116 preferably is used to estimate a position and orientation of the weapon unit 104 relative to the fixture 112. The weapon unit 104 has a coordinate system W that may be related to the coordinate system I of the investigation unit 102.

The geometry of the weapon unit 104 may be determined from the known positions $P_c$ of the camera 116, $F_w$ of the weapon 114 and offset $O_c$ of the camera 116. This information may be used to locate the weapon 114 in three dimensional space, and to aim the weapon 114 at the disruption point D on the suspect object. Vector $V_c$ may be defined between the camera 116 position $P_c$ and the fixture 112 position $P_f$. Based on the known geometry of the weapon unit 104, the weapon vector $V_w$ may be defined between the weapon 114 and the disruption point D.

The weapon 114 may be aligned to the vector $V_w$ so that the discharge 120 may be aimed to hit the disruption point D. Once aligned, the weapon 114 may be activated to deploy the discharge 120. Preferably, weapon 114 is aligned sufficiently to deploy the discharge 120 into the suspect object 101 at the discharge point D to disable the operation thereof. The weapon 114 may be re-aligned to one or more disruption points D.

Referring back to FIG. 1A, the targeting unit 106 may also be linked to the weapon unit 104 for aiming the weapon 114 at the disruption point D of the suspect object 101. The targeting tool 144 may compute geometries of the weapon unit 104 to define a configuration for aiming the weapon 114 at the disruption point D. The targeting tool 144 receives information from the disruption system 100a,b to determine positioning of the components of the investigation unit 102, the contents of the suspect object 101 and the disruption point D. The camera 116 may be used to register the image coordinate system I of the investigation unit 102 to the coordinate system W of the weapon unit 104. The targeting tool 144 may then be used to align the weapon 114 to the disruption point(s) D defined by the investigation tool 142. Preferably, real-time targeting instructions for aiming the weapon 114 at the desired disruption point(s) D are provided by the targeting tool 144.

The target tool 144 is linked to camera 116 of the weapon unit 104, and calculates the 3D position (position and orientation) of the fixture 112. Feature locations are calculated with respect to the fixture. The offset from the camera 116 to the weapon 114 is known. Therefore, the position of features relative to the weapon 114 may also be determined. Since the 3D position of the weapon 114 relative to the disruption point D are known (and updated in real time), the targeting tool 144 may determine the adjustments that must be made in order to aim the weapon 114 at the disruption point D. The analysis tool 146 may be used to perform stereo triangulation or other calculations alone or in combination with the targeting tool 144.

Controller(s) 140 of the targeting unit 106 may be linked to the investigation unit 102 and the targeting unit 106 for selective activation thereof. The controller 140 may provide, for example, real-time adjustment of the fixture 112, camera 116, weapon 114 and/or other components as desired. Optionally, some or all commands from the targeting unit 106 (or other sources) may be automatically generated for automatic adjustment, and/or manual adjustments may be made by operators receiving instructions from the controller 140. The controller 140 may be activated based on the outputs generated by the investigation tool 142, targeting tool 144 and/or analysis tool 146. For example, the fixture mount 256 (FIG. 2A) may be linked to controller 140 for adjusting the position of fixture 112 relative to the camera(s) 116 of the weapon unit 104. In another example, the weapon mount 362 (FIG. 3A) may be linked to controller 140 to position the weapon 114 in alignment with the disruption point D.

The targeting unit 106 may take the form of an entirely hardware embodiment, an entirely software embodiment (including firmware, resident software, micro-code, etc.) or an embodiment combining software and hardware aspects.

Embodiments may take the form of a computer program embodied in any medium having computer usable program code embodied in the medium. The embodiments may be provided as a computer program product, or software, that may include a machine-readable medium having stored thereon instructions, which may be used to program a computer system (or other electronic device(s)) to perform a process.

A machine readable medium includes any mechanism for storing or transmitting information in a form (such as, software, processing application) readable by a machine (such as a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. Embodiments may further be embodied in an electrical, optical, acoustical or other form of propagated signal (e.g., carrier waves, infrared signals, digital signals, etc.), or wireline, wireless, or other communications medium. Further, it should be appreciated that the embodiments may take the form of hand calculations, and/or operator comparisons. To this end, the operator and/or engineer(s) may receive, manipulate, catalog and store the data from the systems, tools and/or units in order to perform tasks depicted in the disruption systems described herein.

Figure 4:
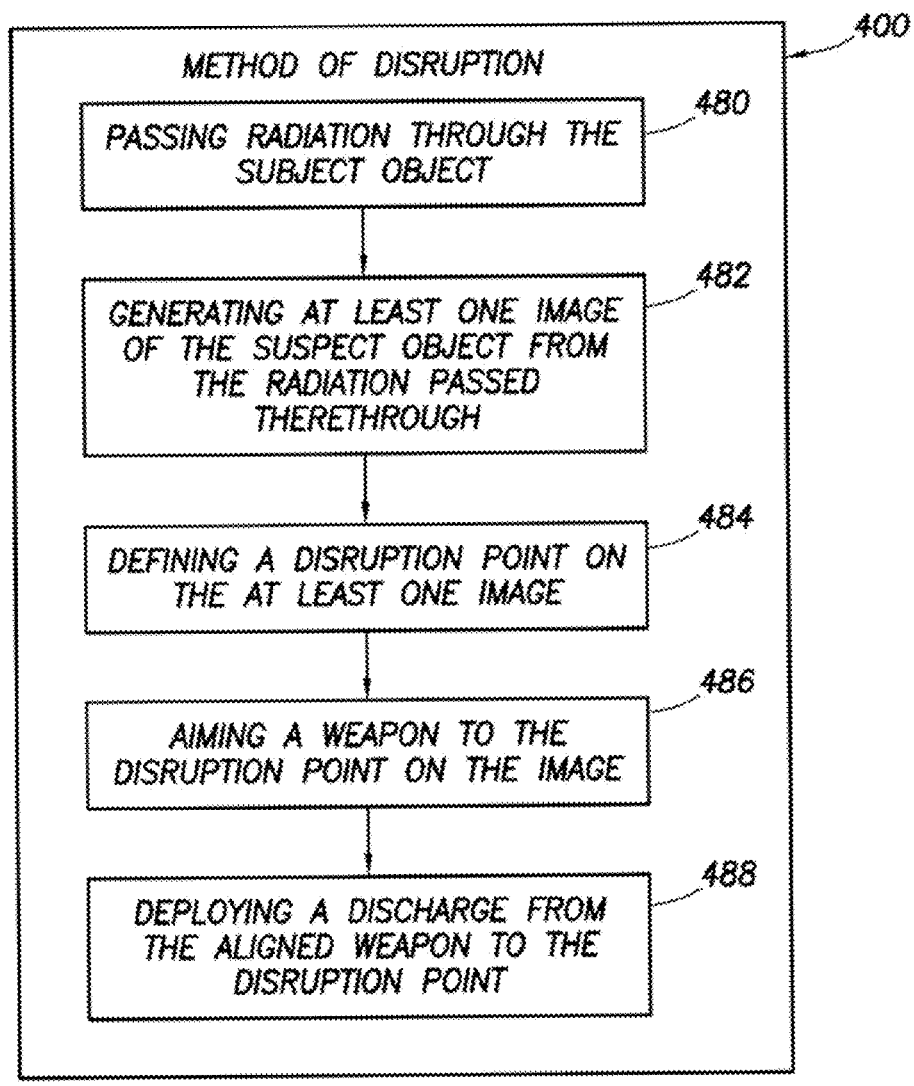
FIG. 4 is a flow chart depicting a method of disrupting a suspect object.

FIG. 4 is a flow chart depicting a method 400 of disrupting a suspect object 101. The method involves passing 480 radiation through the suspect object 101, generating 482 at least one image of the suspect object 101 from the radiation passed therethrough, defining 484 a disruption point D on the at least one image, aiming 486 a weapon 114 to the disruption point D on the image, and deploying 488 a discharge from the aligned weapon 114 to the disruption point D.

The method may also involve defining a position of the suspect object 101 relative to an image coordinate axis I, defining a position of the weapon 114 relative to a weapon coordinate axis W, and linking the position of the weapon 114 to the position of the suspect object 101 by relating the weapon coordinate axis W to the image coordinate axis I.

The method 400 may further involve processing data concerning the disruption system, processing data from the investigation and/or weapon units, analyzing data from the investigation and/or weapon units, performing calibrations, controlling the investigation and/or weapon units, and/or selectively adjusting a position of the investigation and/or weapon units. The steps may be performed in any order and repeated as desired.

It will be understood from the foregoing description that various modifications and changes may be made in the preferred and alternative embodiments of the present invention without departing from its true spirit. For example, the disruption system described herein may have one or more components of the investigation, weapon, and/or target units positionable about one or more suspect objects.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A system for disrupting at least one component of a suspect object, the system comprising:
   a source for passing a radiation through the suspect object;
   a screen for receiving the radiation passing through the suspect object and generating at least one image therefrom;
   a weapon having a discharge deployable therefrom;
   a targeting unit for displaying the at least one image of the suspect object and aiming the weapon at a disruption point on the suspect object located using the displayed image such that the weapon may be positioned to deploy the discharge at the disruption point whereby the suspect object is disabled;
   at least one camera linked to the weapon; and
   at least one fixture adjustably positionable on the screen, the fixture viewable by the at least one camera.

2. A system for disrupting at least one component of a suspect object, the system comprising:
   an investigation unit having at least one source for passing a radiation through the suspect object and a screen for receiving the radiation passing through the suspect object and generating an image therefrom;
   a weapon unit comprising a weapon for deploying a discharge therefrom; and
   a targeting unit for displaying the image of the suspect object and aiming the weapon at a disruption point on the suspect object located using the displayed image whereby the weapon may be positioned to deploy the discharge into the suspect object for disablement thereof, wherein the investigation unit further comprises a fixture and wherein the weapon unit further comprises a camera for viewing the fixture.

3. The system of claim 2, wherein an obstacle is visually blocking the camera from the fixture, the system further comprising a relay unit for visually linking the camera to the fixture.

* * * * *